(12) United States Patent
Zhang et al.

(10) Patent No.: US 12,399,842 B2
(45) Date of Patent: Aug. 26, 2025

(54) SENSITIVE DATA READING METHOD AND APPARATUS, ELECTRONIC DEVICE, AND STORAGE MEDIUM

(71) Applicant: TSINGHUA UNIVERSITY, Beijing (CN)

(72) Inventors: Chao Zhang, Beijing (CN); Wende Tan, Beijing (CN); Yuan Li, Beijing (CN); Ying Liu, Beijing (CN); Jianping Wu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 0 days.

(21) Appl. No.: 18/465,430

(22) Filed: Sep. 12, 2023

(65) Prior Publication Data

US 2023/0418768 A1    Dec. 28, 2023

Related U.S. Application Data

(63) Continuation of application No. PCT/CN2021/123331, filed on Oct. 12, 2021.

(30) Foreign Application Priority Data

Mar. 15, 2021   (CN) .......................... 202110277764.5

(51) Int. Cl.
G06F 12/00        (2006.01)
G06F 12/14        (2006.01)
G06F 12/1027      (2016.01)

(52) U.S. Cl.
CPC ...... *G06F 12/1491* (2013.01); *G06F 12/1027* (2013.01); *G06F 2212/1052* (2013.01)

(58) Field of Classification Search
CPC ............. G06F 12/1491; G06F 12/1027; G06F 2212/1052; G06F 12/1475; G06F 21/54;
(Continued)

(56) References Cited

U.S. PATENT DOCUMENTS

2001/0052039 A1   12/2001   Ishibe
2005/0076226 A1*   4/2005   Boivie .................... G06F 21/64
                                                          713/190
(Continued)

FOREIGN PATENT DOCUMENTS

CN          1511286 A      7/2004
CN        101952809 A      1/2011
(Continued)

OTHER PUBLICATIONS

International Search Report of corresponding International Application No. PCT/CN2021/123331, dated Jan. 21, 2022, 13 pages.
(Continued)

*Primary Examiner* — Mardochee Chery
(74) *Attorney, Agent, or Firm* — Tucker Ellis LLP

(57) ABSTRACT

The present disclosure provides a sensitive data reading method and apparatus, an electronic device, and a storage medium. By initiating a read request for sensitive data stored in a memory page or a memory region, determining a read-only permission result in response to the read request, where the read-only permission result indicates whether the memory page or the memory region is provided with a read-only permission, and reading the sensitive data if the read-only permission result indicates that the memory page or the memory region is provided with the read-only permission, that is, by verifying the read-only permission of the memory page or the memory region storing the sensitive data, embodiments of the present disclosure enable a fast lightweight verification of the integrity of the sensitive data, thereby ensuring that sensitive operations are not hijacked.

11 Claims, 4 Drawing Sheets

(58) Field of Classification Search
CPC ...... G06F 21/64; G06F 21/79; G06F 12/1425; G06F 21/604; G06F 21/6245
USPC .......................................................... 711/163
See application file for complete search history.

(56) References Cited

U.S. PATENT DOCUMENTS

| | | | |
|---|---|---|---|
| 2015/0113242 | A1 | 4/2015 | Abrams et al. |
| 2016/0342465 | A1 | 11/2016 | Cudak et al. |
| 2018/0004680 | A1* | 1/2018 | Elzur .................... G06F 12/145 |

FOREIGN PATENT DOCUMENTS

| | | |
|---|---|---|
| CN | 102420017 A | 4/2012 |
| CN | 102831069 A | 12/2012 |
| CN | 103632088 A | 3/2014 |
| CN | 106168920 A | 11/2016 |
| CN | 108090366 A | 5/2018 |
| CN | 108154032 A | 6/2018 |
| CN | 109670312 A | 4/2019 |
| CN | 110119632 A | 8/2019 |
| CN | 111104691 A | 5/2020 |
| CN | 111913806 A | 11/2020 |
| CN | 112115521 A | 12/2020 |
| CN | 112948863 A | 6/2021 |
| GB | 2378005 A | 1/2003 |

OTHER PUBLICATIONS

First Office Action of corresponding Chinese Application No. 202110277764.5, dated Sep. 16, 2021, 11 pages.
Second Office Action of corresponding Chinese Application No. 202110277764.5, dated Nov. 30, 2021, 12 pages.
Decision on Rejection of corresponding Chinese Application No. 202110277764.5, dated Jan. 27, 2022, 6 pages.
Notification to Grant Patent Right for Invention of corresponding Chinese Application No. 202110277764.5, dated Jun. 22, 2022, 7 pages.
Zhou Enguang et al., "An Improved Data Integrity Verification Scheme for Cloud Storage", Journal of Electronics, dated Jan. 15, 2014, 6 pages.
Office Action and Supplementary European Search Report of corresponding European Patent Application No. 21931205.5, dated Jun. 27, 2024, 9 pages.
Chao Zhang et al., "VTint: Protecting Virtual Function Tables' Integrity", Proceedings 2015 Network and Distributed System Security Symposium, Feb. 11, 2015, Retrieved from the Internet: URL: https://people.eecs.berkeley.edu/~dawnsong/papers/VTint-%20Protecting%20Virtual%20Function%20Tables'%20Integrity_feb%202015.pdf, 15 pages.
Robert Gawlik et al., "Towards Automated Integrity Protection of C++ Virtual Function Tables in Binary Programs", Pervasive Technologies Related To Assistive Environments, Dec. 8, 2014, pp. 396-405.
Wende Tan et al., "ROLoad: Securing Sensitive Operations with Pointee Integrity", 2021 58TH Acm/IEEE Design Automation Conference (Dac), IEEE, 2021-12-05, pp. 307-312.

* cited by examiner

SENSITIVE DATA READING METHOD AND APPARATUS, ELECTRONIC DEVICE, AND STORAGE MEDIUM

CROSS-REFERENCE TO RELATED APPLICATIONS

The present application is a continuation of International Application No. PCT/CN2021/123331 filed on Oct. 12, 2021, which claims priority to Chinese Patent Application No. 202110277764.5, filed with China National Intellectual Property Administration on Mar. 15, 2021 and entitled "SENSITIVE DATA READING METHOD AND APPARATUS, ELECTRONIC DEVICE, AND STORAGE MEDIUM". Both of the applications are hereby incorporated by reference in their entireties.

TECHNICAL FIELD

The disclosure relates to the computer technology and, in particular, to a sensitive data reading method and apparatus, an electronic device and a storage medium.

BACKGROUND

Computer software has always been facing serious security threats, among which memory corruption vulnerabilities are the most widespread security threat. These vulnerabilities are often exploited by attackers to corrupt sensitive data used by sensitive operations, and then hijack or corrupt sensitive operations.

In the prior art, the most fundamental defense scheme against the above threats is to ensure the integrity of the sensitive data. A common mechanism is to verify the integrity of the sensitive data based on block cipher algorithms. However, this method has high performance overhead.

SUMMARY

In view of the above problems, the present disclosure provides a sensitive data reading method and apparatus, an electronic device and a storage medium.

In a first aspect, the present disclosure provides a sensitive data reading method, including: initiating a read request for sensitive data stored in a memory page or a memory region; determining a read-only permission result in response to the read request, where the read-only permission result indicates whether the memory page or the memory region is provided with a read-only permission; reading the sensitive data, if the read-only permission result indicates that the memory page or the memory region is provided with the read-only permission.

In an other implementation manner, the determining the read-only permission result includes: determining the read-only permission result based on a translation lookaside buffer, a page table, or a register provided by an other memory management mechanism, where various permission results of respective memory pages or memory regions are stored in the translation lookaside buffer, the page table, or the register provided by the other memory management mechanism.

In an other implementation manner, the method further includes: reading none of the sensitive data, if the read-only permission result indicates that the memory page or the memory region is not provided with the read-only permission.

In an other implementation manner, the method further includes: determining an other permission result, where the other permission result is used to indicate whether an other permission of the memory page or the memory region is legal except for the read-only permission result; reading the sensitive data, if the other permission result indicates that the other permission of the memory page or the memory region is legal and the read-only permission result indicates that the memory page or the memory region is provided with the read-only permission.

In an other implementation manner, the method further includes: outputting a first error signal, if the other permission result indicates that the other permission of the memory page or other memory region is illegal; outputting a second error signal, if the other permission result indicates that the other permission of the memory page or the memory region is legal but the read-only permission result indicates that the memory page or the memory region is not provided with the read-only permission.

In an other implementation manner, where determining the read-only permission result, determining the other permission result and reading the sensitive data are realized through an instruction set architecture.

In a second aspect, the present disclosure provides a sensitive data reading apparatus, including: a request module, configured to initiate a read request for sensitive data stored in a memory page or a memory region; a determining module, configured to determine a read-only permission result in response to the read request, where the read-only permission result indicates whether the memory page or the memory region is provided with a read-only permission; a reading module, configured to read the sensitive data if the read-only permission result indicates that the memory page or the memory region is provided with the read-only permission.

In a third aspect, the present disclosure provides an electronic device, including: at least one processor and a memory;

the memory stores a computer-executed instruction; the at least one processor executes the computer-executed instruction stored in the memory, to cause the at least one processor to execute the method according to any one of the implementations of the first aspect.

In a fourth aspect, the present disclosure provides a readable storage medium, where the readable storage medium stores a computer-executed instruction therein, and when a processor executes the computer-executed instruction, the method according to any one of the implementations of the first aspect is implemented.

In a fifth aspect, the present disclosure provides a computer program product, including a computer program, where when the computer program is executed by a processor, the method according to any one of the implementations of the first aspect is implemented.

In the sensitive data reading method and apparatus, the electronic device and the storage medium provided by the present disclosure, the read request for the sensitive data stored in the memory page or the memory region is initiated; the read-only permission result is determined in response to the read request, where the read-only permission result indicates whether the memory page or the memory region is provided with the read-only permission; and the sensitive data is read if the read-only permission result indicates that the memory page or the memory region is provided with the read-only permission. That is, by verifying the read-only permission of the memory page or the memory region storing the sensitive data, embodiments of the present disclosure enable a fast lightweight verification of the integrity of the sensitive data, thereby ensuring that sensitive operations are not hijacked.

DETAILED DESCRIPTION OF EMBODIMENTS

In order to make the purpose, technical solutions, and advantages of the embodiment of the present disclosure more clear, the technical solutions in the embodiments of the present disclosure will be clearly and comprehensively described below in conjunction with the accompanying drawings in the embodiments of the present disclosure.

Computer software has always been facing serious security threats, among which memory corruption vulnerabilities are the most widespread security threat. These vulnerabilities are often exploited by attackers to corrupt operands (i.e., sensitive data) of sensitive operations, and then hijack or corrupt sensitive operations.

Sensitive operations include but are not limited to: program control flow transfer (program counter update), sensitive API calls (such as system( ) function, SQL query, etc.), security checks (various allowlist checks, etc.), key service operations (such as transfer, password decryption, etc.). The operands of sensitive operations, that is, sensitive data, include but are not limited to: operands of program control flow transfers (function return addresses, function pointers, etc.), arguments of sensitive API calls (commands executed by the system( ) function, statement arguments of SQL queries), the allowlist configuration used for security checks, the operands of key service operations (such as the receiving address of the transfer operation, the ciphertext input of the decryption operation), etc.

Figure 1:
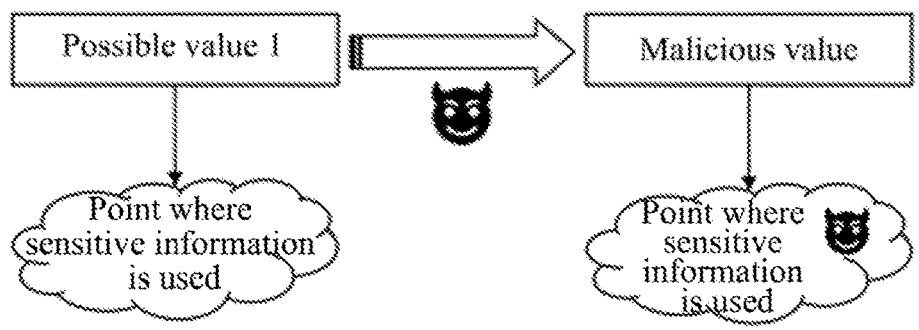
FIG. 1 is a schematic diagram of sensitive data being corrupted in the prior art.

Once sensitive data is corrupted, attackers can launch a variety of attacks. FIG. 1 is a schematic diagram of sensitive data being corrupted in the prior art. As shown in FIG. 1, when sensitive data, such as possible value 1, is corrupted by attackers and becomes a malicious value, and the malicious value is used at a point where sensitive information is used. For example, attackers can corrupt function pointers or function return addresses to hijack program control flow, or corrupt arguments of sensitive API functions such as system( ) or execve( ) to perform dangerous operations (such as command injection attacks, SQL injection attacks), and these are currently the most popular and harmful attack types. Attackers can also corrupt the allowlist configuration used in security checks, such as user identifiers (uid), condition flags, or other metadata (such as configuration information, policy information, or shadow memory), etc., to bypass deployed security protection measures or launch data-oriented attacks. Attackers can also corrupt the operands of key service operations, hijack the receiving address of transfer operations, decrypt target ciphertext and more.

Figure 2:
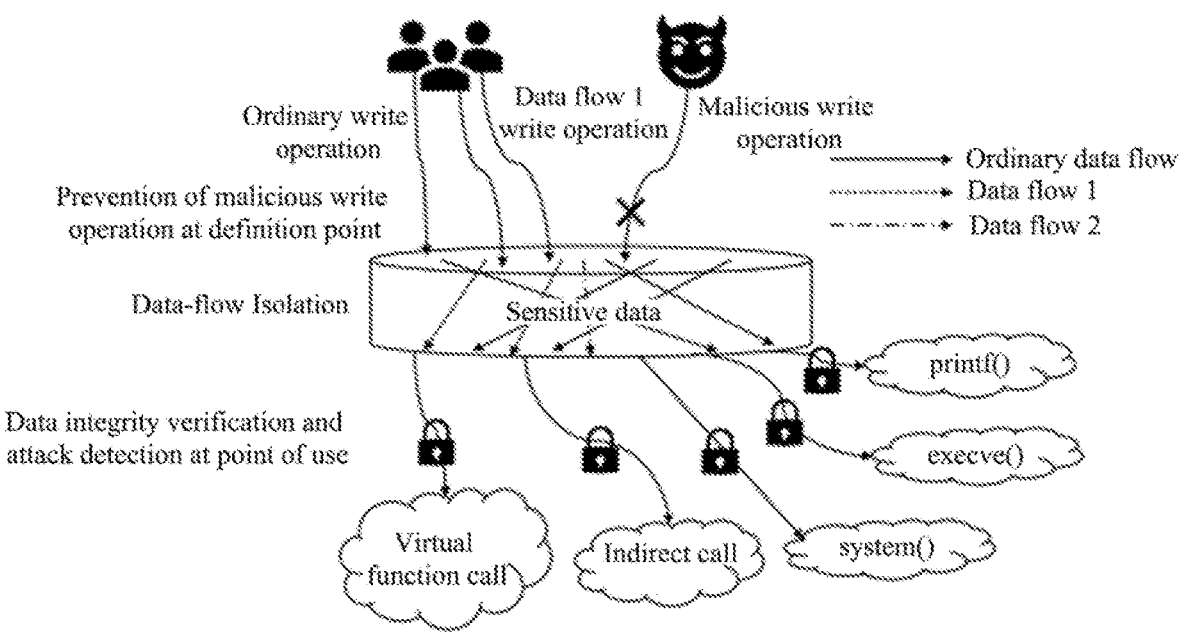
FIG. 2 is a schematic diagram of three mechanisms for verifying integrity of sensitive data in the prior art.

Aiming at the threat of sensitive data being corrupted and sensitive operations then being hijacked, the most fundamental defense solution needs to ensure data-flow integrity (Data-Flow Integrity, DFI), that is, to ensure that the data flow graph of the software (the relationship between a definition point and a point of use) will not be violated at runtime, to ensure that the point where sensitive information is used will not be corrupted. Data has its definition point and point of use, and according to different defense deployment stages, a data flow integrity mechanism can be divided into three categories: a first one is a mechanism for preventing malicious memory read and write operations at the definition point; a second one is a mechanism for isolating sensitive data flow from ordinary data flow; a third one is a mechanism for verifying data integrity and detecting attacks at the point of use. FIG. 2 is a schematic diagram of three mechanisms for verifying the integrity of sensitive data in the prior art.

In the first mechanism, security check at the data definition point (memory write operations) is performed to ensure that illegal memory writes will not occur. Solutions such as SoftBound and AddressSanitizer implement bounds checks or timing checks at the software level, and provide relatively strong data flow integrity protection, but their performance overhead is high. MPX (memory protection extension) is a hardware extension of Intel, which is designed to perform bounds checks efficiently, thereby preventing out-of-bounds memory corruption attacks and providing spatial memory safety protection. The MTE (memory tagging extension) hardware mechanism proposed by ARM associates each memory word with a corresponding tag, which can be used to realize spatial and temporal memory safety protection. The performance overhead of these two solutions are relatively high, and related features have been removed from hardware or have not yet been implemented.

In the second mechanism, data flow integrity protection is provided by isolating sensitive data such as code pointers and blocking potentially harmful memory write operations from corrupting sensitive data. The HDFI (hardware-assisted data-flow isolation) scheme associates each memory word or every several memory words with a 1-bit memory tag, while IMIX (in-process memory isolation extension) scheme associates each memory page with a 1-bit memory tag, thereby providing relatively strong data flow isolation and security guarantee. Intel MPK (memory protection keys) and ARM DACR (domain access control register) divide memory pages into several keys or domains, and provide users with control registers to adjust the permissions of memory pages to implement data flow isolation. Hardware features such as Intel SMAP (supervisor mode access prevention), Intel SMEP (supervisor mode execution prevention), ARM PAN (privileged access never), RISC-V SUM (supervisor user memory), etc. provide isolation between kernel mode and user mode. The defense strength of these schemes is usually not high enough.

In the third mechanism, sensitive operations are protected by verifying data integrity at the point of use to ensure that operands used by sensitive operations are not tampered with. The ARM PA (pointer authentication) mechanism implements the integrity verification of sensitive data based on a block cipher algorithm. This has been initially applied in products such as Apple mobile phones and has achieved relatively good protection effects thereon, but its performance overhead is relatively high. Solutions such as Stack-Guard verify the integrity of the return address by placing

*canaries*/cookies on the stack and verifying whether the *canaries*/cookies are corrupted before the function returns, but its defense strength is relatively low.

In view of the above problems, the technical idea of the present disclosure is: for reading sensitive data, whether the memory page or the memory region storing the sensitive data is read-only is verified. If it is read-only, it means that the sensitive data is complete and not corrupted, and can be successfully read. Moreover, by verifying the read-only property of the memory page or the memory region storing sensitive data, a fast lightweight verification of the integrity of sensitive data is implemented, and it is thereby ensured that sensitive operation are not hijacked.

Figure 3:
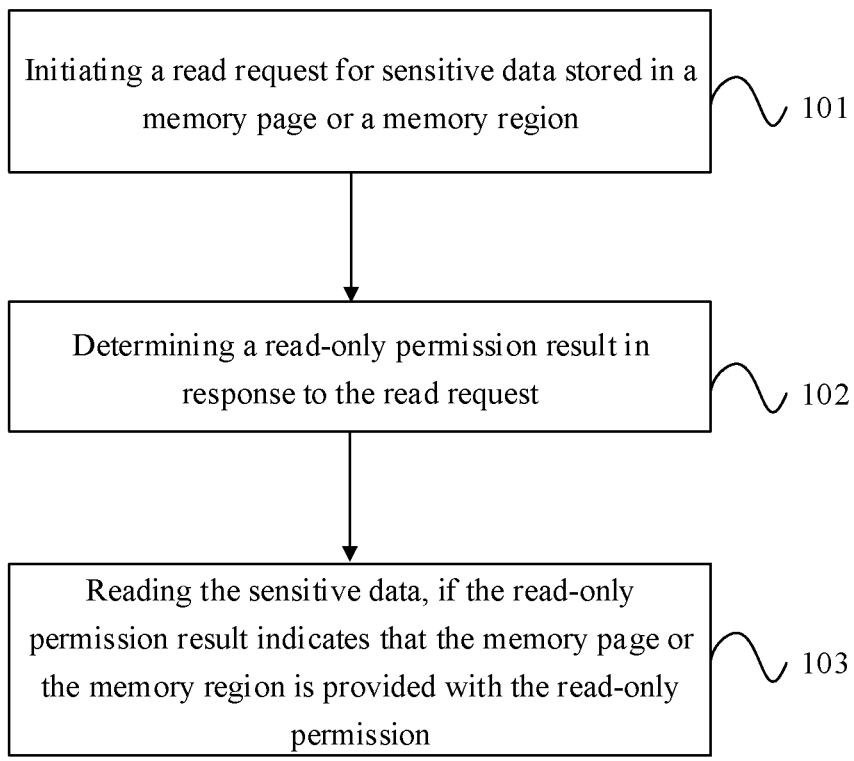
FIG. 3 is a schematic flowchart of a sensitive data reading method provided by the present disclosure.

In a first aspect, an embodiment of the present disclosure provides a sensitive data reading method. FIG. 3 is a schematic flowchart of a sensitive data reading method provided by the present disclosure.

As shown in FIG. 3, the sensitive data reading method includes the following steps.

Step 101, initiating a read request for sensitive data stored in a memory page or a memory region.

Specifically, when a compiled executable file is running on a processor of an electronic device, to read sensitive data, the executable file initiates a read request for the sensitive data through a memory read instruction. Memory page is a feature widely existing on computer systems (such as RISC-V, ARM, MIPS, x86, etc.) with paging mechanism (i.e., memory management unit (MMU)), and memory region widely exists on computer systems with physical memory protection (such as physical memory protection (PMP) of RISC-V or memory protection unit (MPU) of ARM).

Step 102, determining a read-only permission result in response to the read request.

The read-only permission result indicates whether the memory page or the memory region is provided with a read-only permission.

Specifically, when sensitive data in the memory page or the memory region need to be read, the processor checks whether the memory page or the memory region is read-only.

It should be noted that steps 101 and 102 can be implemented by a special memory read instruction, that is, when the execution of a software goes to the special memory read instruction, the read-only permission check of the memory page or the memory region can carried out while the request to read sensitive data is made; or, step 101 is implemented by a regular memory read instruction, and the present disclosure also provides a special instruction. This special instruction is used for the read-only permission check of the memory page or the memory region, that is to say, the combination of the regular memory read instruction and the special instruction implements the read-only permission check of the memory page or the memory region while the request to read sensitive data is made.

As an embodiment, determining the read-only permission result includes: determining the read-only permission result based on a translation lookaside buffer, a page table, or a register provided by an other memory management mechanism, where various permission results of respective memory pages or memory regions are stored in the translation lookaside buffer, the page table, or the register provided by the other memory management mechanism.

Specifically, one of functions of a memory management unit inside the processor is permission control of the memory page. For example, the translation lookaside buffer (TLB for short) or the page table stores various permission results of respective memory pages, and the processor can check, from the translation lookaside buffer or the page table, whether an accessed memory page is provided with the read-only permission; or, the register for the other memory management mechanism also stores various permissions of respective memory regions, and the processor can determine, from the corresponding register, whether an accessed memory region is provided with the read-only permission.

Step 103, reading the sensitive data, if the read-only permission result indicates that the memory page or the memory region is provided with the read-only permission.

Specifically, the permission result of the memory page or the memory region includes being provided with the read-only permission and being not provided with the read-only permission. When the memory page or the memory region is provided with the read-only permission, which means that sensitive data is stored in a read-only memory page or a read-only memory region and is not changed by an attacker, the data can be read at this time, allowing the software to continue to run; if the memory page or the memory region is not provided with the read-only permission, it means that the sensitive data is not stored in a read-only memory page or a read-only memory region, and may have been changed into a malicious value by the attacker. At this time, the sensitive data may not be read, and running of software is stopped. That is to say, the method further includes: if the read-only permission result indicates that the memory page or the memory region is not provided with the read-only permission, the sensitive data is not read.

In addition, it should be noted that before step 101, first, at the stage of compiling the software, the used sensitive data needs to be set in a read-only section of a compiled product of software source codes, so that the compiled executable file, at runtime, stores sensitive data in the read-only memory page or the read-only memory region, and associate the sensitive data with the memory read instruction, and then this embodiment is executed. In this way, false verification due to sensitive data not originally stored in the read-only memory page or the read-only memory region can be avoided.

In the sensitive data reading method provided by the embodiment of the present disclosure, by initiating a read request for sensitive data stored in a memory page or a memory region, determining a read-only permission result in response to the read request, where the read-only permission result indicates whether the memory page or the memory region is provided with a read-only permission, and reading the sensitive data if the read-only permission result indicates that the memory page or memory region is provided with the read-only permission, that is, by verifying the read-only property of the memory page or the memory region storing the sensitive data, the embodiment of the present disclosure enables a fast lightweight verification of the integrity of the sensitive data, thereby ensuring that the sensitive operations are not hijacked.

Figure 4:
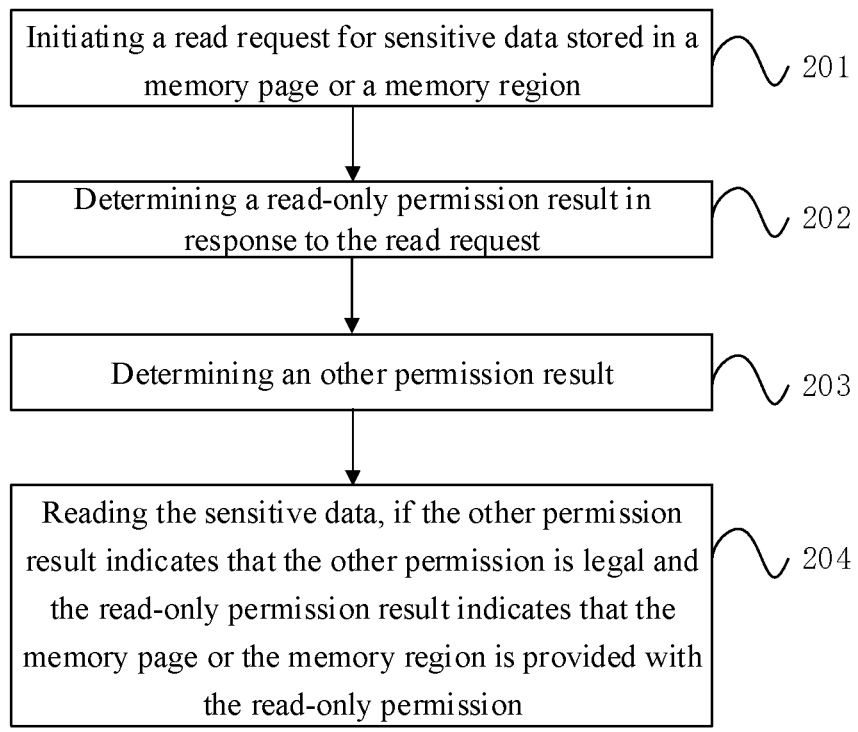
FIG. 4 is a schematic flowchart of another sensitive data reading method provided by the present disclosure.

In combination with the above implementations, FIG. 4 is a schematic flowchart of another sensitive data reading method provided by the present disclosure. As shown in FIG. 4, the sensitive data reading method includes the following steps.

Step 201, initiating a read request for sensitive data stored in a memory page or a memory region.

Step 202, determining a read-only permission result in response to the read request.

The read-only permission result indicates whether the memory page or the memory region is provided with a read-only permission.

Step 203, determining an other permission result.

The other permission result is used to indicate whether an other permission of the memory page or the memory region is legal except for the read-only permission result.

Step 204, reading the sensitive data, if the other permission result indicates that the other permission is legal and the read-only permission result indicates that the memory page or the memory region is provided with the read-only permission.

Implementations of Step 201 and Step 202 in this embodiment are similar to the implementations of Step 101 and Step 102 in the preceding embodiment, respectively, and details will not be repeated here.

Different from the preceding embodiment, it is also necessary to consider whether the other regular permission of the memory page or the memory region is legal, and the other regular permission includes a read permission, etc. In this embodiment, the other permission result is determined, where the other permission result is used to indicate whether the other permission of the memory page or the memory region is legal except for the read-only permission result; if the other permission result indicates that the other permission is legal and the read-only permission result indicates that the memory page or the memory region is provided with the read-only permission, then the sensitive data is read.

Specifically, the memory management unit or other memory management mechanism inside the processor can control the permissions of the memory page or the memory region. For example, a processor status, a memory operation, and permissions of various memory pages or memory regions are used as an input and an output is whether the memory operation is legal. If the memory operation is illegal, the processor will generate a page fault or another exception. In this embodiment, in addition to verifying whether the other permission of the memory page or the memory region is legal, the read-only permission of the memory page or the memory region is also verified. When the other permission result indicates that the other permission of the memory page or the memory region is legal and the read-only permission result indicates that the memory page or the memory region is provided with the read-only permission, the sensitive data is read.

As an embodiment, determining the read-only permission result, determining the other permission result and reading the sensitive data are realized through an instruction set architecture.

Specifically, the other permission of the memory page or the memory region may be based on a traditional memory page or memory region permission check, that is, implemented based on the instruction set architecture, for example, a RISC-V instruction set architecture. In order to realize the read-only permission check of the memory, implementation may be based on an extension of the RISC-V instruction set architecture, that is, the RISC-V instruction set architecture is slightly modified and integrated into the RISC-V processor core.

The slight modification of the RISC-V instruction set architecture includes the following steps.

(1) Adding mnemonics of hardware instructions into the instruction set architecture. This includes extending ld, lwu, lhu, lbu, lw, lh, and lb to ld.ro, lwu.ro, lhu.ro, lbu.ro, lw.ro, lh.ro, and lb.ro, respectively, and adding them to the instruction set architecture. Since the operands of a large number of sensitive operations are full-word data such as pointers, the ld instruction is more commonly used. Therefore, this embodiment also optimizes the ld.ro instruction, and in the case of loading a 64-bit word on a 64-bit system, the size of the program can be reduced. Specifically, this embodiment also extends the RISC-V compressed instruction set architecture, and realizes the compressed encoding version of ld.ro, i.e., c.ld.ro, that is, the hardware instruction provided by the present disclosure corresponding to c.ld.

(2) Choosing instruction formats according to the added mnemonics of the hardware instructions. The instruction format should be chosen in the following way: 1) choosing from free and available instruction encoding slots, such as custom instruction slots or reserved instruction slots; 2) only a small amount of extra circuits are introduced when the instruction is decoded. In this embodiment, an encoding mode similar to that of the existing ld instruction etc. is selected for the above instructions (i.e., such as the ld.ro instruction). Specifically, instructions such as ld.ro are encoded in a same way as the ld instruction etc., however, the third (counted from zero) least significant bit is changed from 0 to 1. Instructions such as c.ld.ro are also encoded in a same way as c.ld, but its three most significant bits are changed from 011 to 100.

(3) Expanding the instruction decoder of the processor core according to the chosen instruction format. Instruction decoder is one of the most complex components in the processor core. After the instruction format is chosen, this embodiment modifies the Instructions, Decode, and RVC-Decoder of the Rocket Chip Generator (the generator of the Rocket Core), so that it can generate a decoder of the instruction format selected in (2). After these instructions are decoded, a new type of memory operation is generated. In this embodiment, such new type of memory operation is further added into MemoryOpConstants, and is used when the subsequent memory page permission check is performed by the TLB class.

It should be noted that the hardware instruction of the present disclosure are not limited to the RISC-V instruction set architecture, and are applicable to any computer system with a paging mechanism or a physical memory protection mechanism.

As an embodiment, the method further includes: outputting a first error signal, if the other permission result indicates that the other permission of the memory page or the memory region is illegal; outputting a second error signal, if the other permission result indicates that the other permission of the memory page or the memory region is legal but the read-only permission result indicates that the memory page or the memory region is not provided with the read-only permission.

Specifically, the page fault handler (arch/riscv/mm/fault.c) in the RISC-V instruction set architecture support of Linux kernel can be modified. At the beginning, distinguish whether the page fault is caused by illegal read-only permission or by illegal regular permission; if the other regular permission is illegal, the first error signal, such as a regular page fault signal, is sent; if the other permission is legal, the page fault is triggered by the illegality of the read-only permission, and the modified Linux kernel sends a second error signal to a faulty process, such as a segmentation fault signal (SIGSEGV) to send a warning to the process or terminate the process. In an embodiment, the first error signal and the second error signal may be a same signal.

Figure 5:
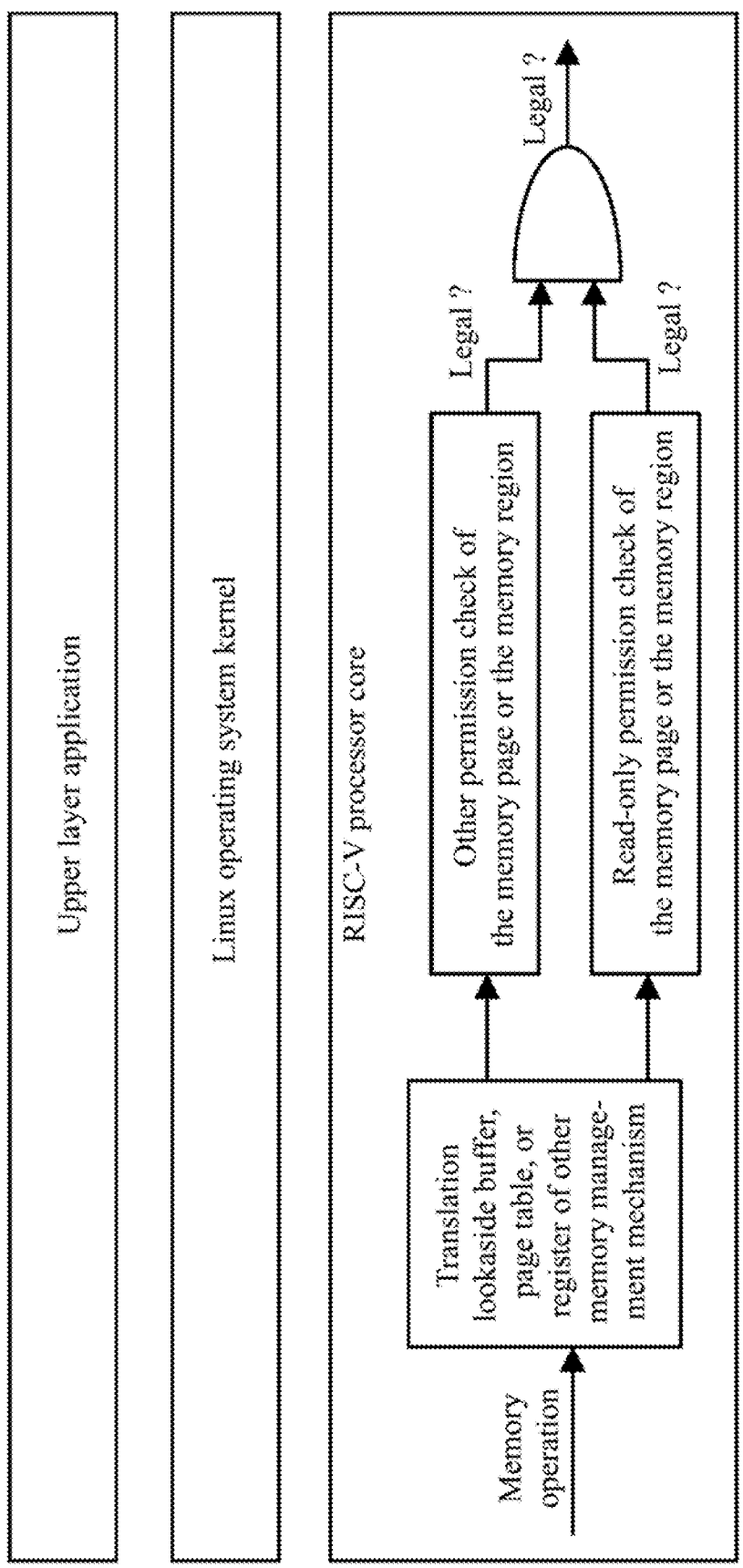
FIG. 5 is a schematic diagram of a sensitive data reading method provided by the present disclosure.

FIG. 5 is a schematic diagram of a sensitive data reading method provided by the present disclosure. As shown in FIG. 5, sensitive data in an upper layer application (i.e., software) is set in a read-only section; the operating system kernel implements the embodiment, such as the Linux operating system kernel; and the RISC-V processor core, modifies the RISC-V instruction of a memory page permission control part of a memory management unit, and adds some lightweight logic thereto to check whether an accessed memory page or memory region is read-only (that is, determined by the various permissions of respective memory pages or memory regions stored in a translation lookaside buffer, a page table, or a register of an other memory management mechanism). If the accessed memory page or memory region is read-only, it means that this is legal and the check is passed; otherwise, this is illegal, and the check is not passed; if the above check is passed, the behavior for the instruction of the present disclosure is the same as that of the regular memory read instruction; otherwise, the processor generates a page fault; an AND operation is eventually performed on an output result of the read-only permission and an output result of the other permission of the memory page or the memory region. That is to say, the other traditional permission check and the read-only permission check of the memory page or memory region are completed in parallel without interfering with each other.

In the sensitive data reading method provided in this embodiment, by determining the other permission result, where the other permission result is used to indicate whether the other permission of the memory page or the memory region is legal except for the read-only permission result and reading the sensitive data if the other permission result indicates that the other permission of the memory page or the memory region is legal and the read-only permission result indicates that the memory page or the memory region is provided with the read-only permission, that is, on the basis of verifying the legality of the other permission of the memory page or memory region, by verifying the read-only permission of the memory page or the memory region storing the sensitive data, the embodiment of the present disclosure enables a fast lightweight verification of the integrity of the sensitive data, thereby ensuring that sensitive operations are not hijacked.

Figure 6:
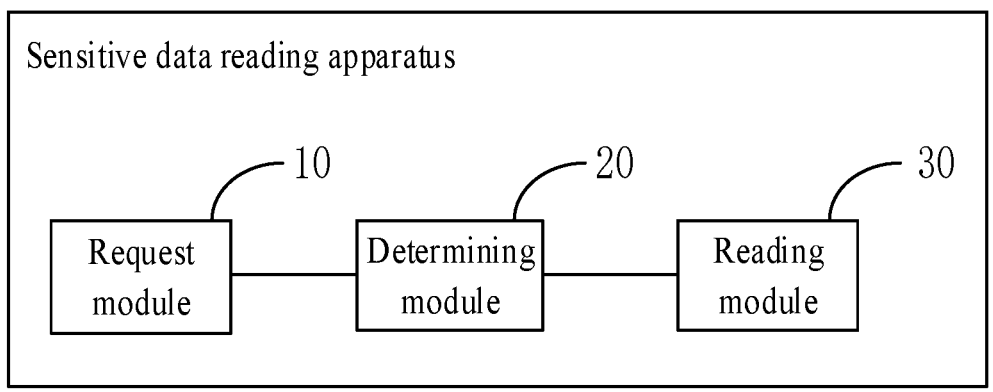
FIG. 6 is a schematic structural diagram of a sensitive data reading apparatus provided by the present disclosure.

In a second aspect, an embodiment of present disclosure provides a sensitive data reading apparatus. FIG. 6 is a schematic structural diagram of a sensitive data reading apparatus provided by the present disclosure. As shown in FIG. 6, the sensitive data reading apparatus includes:

a request module 10, which initiates a read request for sensitive data stored in a memory page or memory region; a determining module 20, configured to determine a read-only permission result in response to the read request, where the read-only permission result indicates whether the memory page or the memory region is provided with a read-only permission; a reading module 30, configured to read the sensitive data if the read-only permission result indicates that the memory page or the memory region is provided with the read-only permission.

In an other implementation manner, the determination module 20 is specifically configured to: determine the read-only permission result based on a translation lookaside buffer, a page table, or a register provided by an other memory management mechanism, where various permission results of respective memory pages or memory regions are stored in the translation lookaside buffer, the page table, or the register provided by the other memory management mechanism.

In an other implementation manner, the reading module 30 is further configured to: read none of the sensitive data, if the read-only permission result indicates that the memory page or the memory region is not provided with the read-only permission.

In an other implementation manner, the determining module 20 is further configured to: determine an other permission result, where the other permission result is used to indicate whether the other permission of the memory page or the memory region is legal except for the read-only permission result; the reading module 30 is used to read the sensitive data, if the other permission result indicates that the other permission is legal and the read-only permission result indicates that the memory page or the memory region is provided with the read-only permission.

In an other implementation manner, the reading module 30 is further configured to: output a first error signal if the other permission result indicates that the other permission of the memory page or the memory region is illegal; output a second error signal, if the other permission result indicates that the other permission of the memory page or the memory region is legal, but the read-only permission result indicates that the memory page or the memory region is not provided with the read-only permission.

In an other implementation manner, determining the read-only permission result, determining the other permission result, and reading the sensitive data are realized through an instruction set architecture.

Those skilled in the art can clearly understand that for the convenience and brevity of the description, for a specific working process and corresponding beneficial effects of the sensitive data reading apparatus described above, reference can be made to the corresponding process in the above method embodiments, which are not repeated here.

In the sensitive data reading apparatus provided by the present disclosure, by a request module configured to initiate a read request for sensitive data stored in a memory page or a memory region, a determining module configured to determine a read-only permission result in response to the read request, where the read-only permission result indicates whether the memory page or the memory region is provided with a read-only permission, a reading module configured to read the sensitive data if the read-only permission result indicates that the memory page or the memory region is provided with the read-only permission, that is, by verifying the read-only property of the memory page or the memory region storing the sensitive data, the embodiment of the present disclosure enables a fast lightweight verification of the integrity of the sensitive data, thereby ensuring that sensitive operations are not hijacked.

Figure 7:
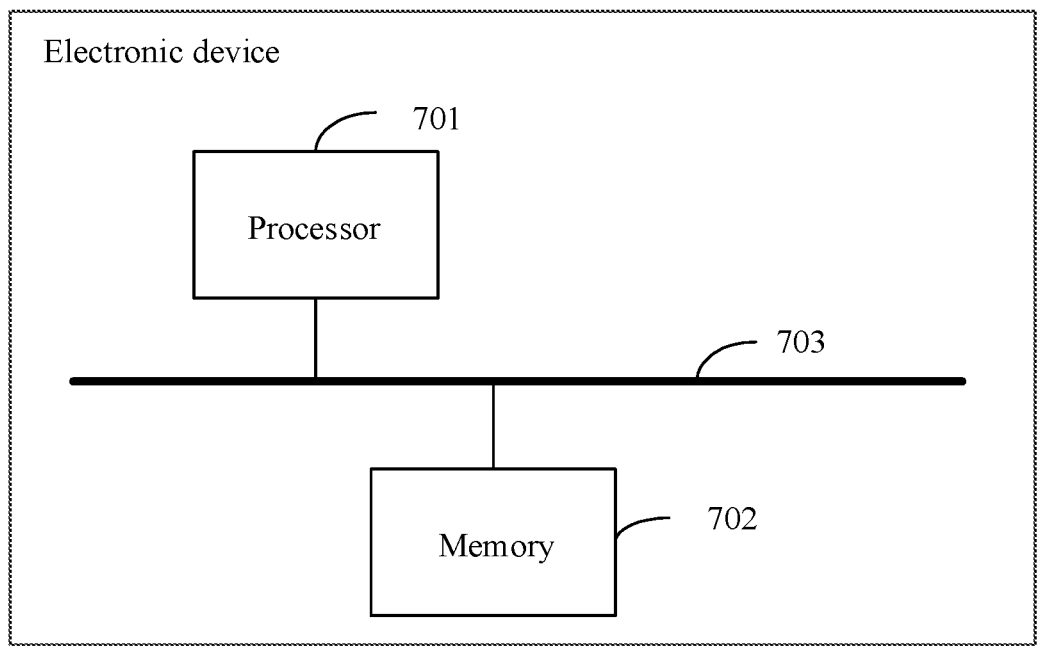
FIG. 7 is a schematic structural diagram of an electronic device provided by the present disclosure.

In a third aspect, an embodiment of present disclosure provides an electronic device. FIG. 7 is a schematic diagram of a hardware structure of an electronic device provided by the present disclosure. As shown in FIG. 7, the electronic device includes:

at least one processor 701 and a memory 702.

In a specific implementation process, the at least one processor 701 executes a computer-executed instruction stored in the memory 702, so that the at least one processor 701 executes the above sensitive data reading method, where the processor 701 and the memory 702 are connected through a bus 703.

For a specific implementation process of the processor 701, reference can be made to the above method embodiments, and implementation principles and technical effects thereof are similar, which are not repeated in this embodiment.

In the above embodiment shown in FIG. 7, it should be understood that the processor can be a central processing unit (CPU for short), or an other general-purpose processor, a digital signal processor (DSP for short), application specific integrated circuit (ASIC for short), etc.

The general-purpose processor may be a microprocessor, or the processor may be any conventional processor, etc. The steps of the method disclosed in conjunction with the disclosure can be directly implemented by a hardware processor, or implemented by a combination of hardware and software modules in the processor.

The memory may include high-speed RAM memory, and may also include nonvolatile storage NVM, such as at least one disk memory.

The bus may be an Industry Standard Architecture (ISA for short) bus, a Peripheral Component Interconnect (PCI for short) bus or an Extended Industry Standard Architecture (EISA for short) bus, etc. The bus can be divided into an address bus, a data bus, a control bus, and so on. For ease of representation, the buses in the drawings of the present application are not limited to only one bus or one type of bus.

In a fourth aspect, the present disclosure also provides a readable storage medium, where the readable storage medium stores a computer-executed instruction therein, and when a processor executes the computer-executed instruction, the above sensitive data reading method is implemented.

The above readable storage medium can be realized by any type of volatile or nonvolatile storage device or a combination thereof, such as a static random access memory (SRAM), an electrically erasable programmable read-only memory (EEPROM), an Erasable Programmable Read Only Memory (EPROM), a Programmable Read Only Memory (PROM), a Read Only Memory (ROM), a Magnetic Memory, a Flash Memory, a Magnetic Disk, or an Optical Disk. The readable storage medium can be any available medium that can be accessed by a general purpose or special purpose computer.

An exemplary readable storage medium is coupled to the processor such that the processor can read information from, and write information to the readable storage medium. Of course, the readable storage medium can also be a component of the processor. The processor and the readable storage medium may be located in an application specific integrated circuit (ASIC for short). Of course, the processor and the readable storage medium can also exist in the device as discrete components.

Those of ordinary skill in the art can understand that all or part of the steps for implementing the above method embodiments can be completed by program instructions and related hardware. The above program can be stored in a computer-readable storage medium. When the program is executed, the steps including the above method embodiments are implemented; and the above storage medium includes: ROM, RAM, a magnetic disk, or an optical disk and other various media that can store program codes.

In particular, according to an embodiment of the present disclosure, the processes described above with reference to the flowcharts can be implemented as computer software programs. That is, the embodiment of the present disclosure includes a computer program product, which includes a computer program carried on a computer-readable medium, where the computer program includes a program code for executing the method shown in the flowcharts.

Finally, it should be noted that: the above embodiments are only used to illustrate the technical solutions of the present disclosure, rather than limiting them; although the present disclosure has been described in detail with reference to the above embodiments, those of ordinary skill in the art should understand that: it is still possible to modify the technical solutions described in the above embodiments, or perform equivalent replacements for some or all of the technical features; and these modifications or replacements do not make the essence of the corresponding technical solutions deviate from the scope of the technical solutions of the various embodiments of the present disclosure.

What is claimed is:

1. A sensitive data reading method, comprising:
   initiating a read request for sensitive data stored in a memory page or a memory region;
   determining a read-only permission result in response to the read request, wherein the read-only permission result indicates whether the memory page or the memory region is provided with a read-only permission;
   reading the sensitive data, if the read-only permission result indicates that the memory page or the memory region is provided with the read-only permission;
   wherein the method further comprises:
   determining another permission result, wherein the another permission result is used to indicate whether another permission of the memory page or the memory region is legal except for the read-only permission result;
   reading the sensitive data, if the another permission result indicates that the another permission is legal and the read-only permission result indicates that the memory page or the memory region is provided with the read-only permission;
   outputting a first error signal, if the another permission result indicates that the another permission of the memory page or the memory region is illegal;
   outputting a second error signal, if the another permission result indicates that the another permission of the memory page or the memory region is legal but the read-only permission result indicates that the memory page or the memory region is not provided with the read-only permission.

2. The method according to claim 1, wherein determining the read-only permission result comprises:
   determining the read-only permission result based on a translation lookaside buffer, a page table, or a register provided by another memory management mechanism, wherein various permission results of respective memory pages or memory regions are stored in the translation lookaside buffer, the page table, or the register provided by the another memory management mechanism.

3. The method according to claim 2, wherein determining the read-only permission result, determining the another permission result, and reading the sensitive data are realized through an instruction set architecture.

4. The method according to claim 1, further comprising:
   reading none of the sensitive data, if the read-only permission result indicates that the memory page or the memory region is not provided with the read-only permission.

5. The method according to claim 4, wherein determining the read-only permission result, determining the another permission result, and reading the sensitive data are realized through an instruction set architecture.

6. The method according to claim 1, wherein determining the read-only permission result, determining the another permission result, and reading the sensitive data are realized through an instruction set architecture.

7. An electronic device, comprising: at least one processor and a memory;
the memory stores a computer-executed instruction;
the at least one processor executes the computer-executed instruction stored in the memory, to cause the at least one processor to:
initiate a read request for sensitive data stored in a memory page or a memory region;
determine a read-only permission result in response to the read request, wherein the read-only permission result indicates whether the memory page or the memory region is provided with a read-only permission;
read the sensitive data if the read-only permission result indicates that the memory page or the memory region is provided with the read-only permission;
wherein the at least one processor executes the computer-executed instruction stored in the memory, to cause the at least one processor to further:
determine another permission result, wherein the another permission result is used to indicate whether another permission of the memory page or the memory region is legal except for the read-only permission result;
read the sensitive data, if the another permission result indicates that the another permission is legal and the read-only permission result indicates that the memory page or the memory region is provided with the read-only permission;
output a first error signal, if the another permission result indicates that the another permission of the memory page or the memory region is illegal;
output a second error signal, if the another permission result indicates that the another permission of the memory page or the memory region is legal but the read-only permission result indicates that the memory page or the memory region is not provided with the read-only permission.

8. The electronic device according to claim 7, wherein the at least one processor executes the computer-executed instruction stored in the memory, to cause the at least one processor to further:
determine the read-only permission result based on a translation lookaside buffer, a page table, or a register provided by another memory management mechanism, wherein various permission results of respective memory pages or memory regions are stored in the translation lookaside buffer, the page table, or the register provided by the another memory management mechanism.

9. The electronic device according to claim 7, wherein the at least one processor executes the computer-executed instruction stored in the memory, to cause the at least one processor to further:
read none of the sensitive data, if the read-only permission result indicates that the memory page or the memory region is not provided with the read-only permission.

10. The electronic device according to claim 7, wherein determining the read-only permission result, determining the another permission result, and reading the sensitive data are realized through an instruction set architecture.

11. A non-transitory readable storage medium, wherein the non-volatile readable storage medium stores a computer-executed instruction therein, and when a processor executes the computer-executed instruction, following steps are implemented:
initiating a read request for sensitive data stored in a memory page or a memory region;
determining a read-only permission result in response to the read request, wherein the read-only permission result indicates whether the memory page or the memory region is provided with a read-only permission;
reading the sensitive data, if the read-only permission result indicates that the memory page or the memory region is provided with the read-only permission;
determining another permission result, wherein the another permission result is used to indicate whether another permission of the memory page or the memory region is legal except for the read-only permission result;
reading the sensitive data, if the another permission result indicates that the another permission is legal and the read-only permission result indicates that the memory page or the memory region is provided with the read-only permission;
outputting a first error signal, if the another permission result indicates that the another permission of the memory page or the memory region is illegal;
outputting a second error signal, if the another permission result indicates that the another permission of the memory page or the memory region is legal but the read-only permission result indicates that the memory page or the memory region is not provided with the read-only permission.

* * * * *